United States Patent [19]
Czekansky et al.

[11] Patent Number: 5,553,870
[45] Date of Patent: Sep. 10, 1996

[54] LIP SEAL SEPARATING OIL AND GREASE

[75] Inventors: Edward S. Czekansky, North Canton; Dennis L. Otto, Malvern, both of Ohio

[73] Assignee: The Timken Company, Canton, Ohio

[21] Appl. No.: 195,699

[22] Filed: Feb. 16, 1994

[51] Int. Cl.⁶ ............................................. F16J 15/32
[52] U.S. Cl. ........................... 277/134; 277/153; 384/486
[58] Field of Search .............................. 277/35, 134, 152, 277/153; 384/485, 486; 475/83

[56] References Cited

U.S. PATENT DOCUMENTS

| | | |
|---|---|---|
| 2,453,635 | 11/1948 | Martin, Jr. . |
| 3,501,155 | 3/1970 | Dega et al. . |
| 3,586,342 | 6/1971 | Staab . |
| 3,633,927 | 1/1972 | Van Deven . |
| 3,807,743 | 4/1974 | Burke . |
| 4,399,998 | 8/1983 | Otto . |
| 4,428,630 | 1/1984 | Folger et al. ....................... 277/153 X |
| 4,770,548 | 9/1988 | Otto . |
| 4,799,808 | 1/1989 | Otto ................................. 384/486 X |
| 4,808,012 | 2/1989 | Otto . |
| 4,819,949 | 4/1989 | Otto ................................. 277/134 X |
| 5,017,025 | 5/1991 | Williams ........................... 384/486 X |
| 5,022,659 | 6/1991 | Otto . |
| 5,024,449 | 6/1991 | Otto ................................. 277/134 X |
| 5,129,744 | 7/1992 | Otto et al. ............................ 384/486 |
| 5,190,355 | 3/1993 | Hobbie et al. . |
| 5,201,692 | 4/1993 | Johnson et al. ...................... 475/83 X |
| 5,387,040 | 2/1995 | Firestone et al. ...................... 384/484 |

*Primary Examiner*—Scott W. Cummings
*Attorney, Agent, or Firm*—Polster, Lieder, Woodruff & Lucchesi, L.C.

[57] ABSTRACT

A hub rotates around the end of an axle housing on a tapered roller bearing which is packed with grease. The axle housing, which is part of a drive axle, conveys lubricating oil to the interior of the hub, but the oil does not encounter the grease, for a seal, which is fitted into the end of the bearing, separates the oil from the grease. The seal pumps the grease back to the interior of the bearing and the oil away from the interior of the bearing.

24 Claims, 2 Drawing Sheets

LIP SEAL SEPARATING OIL AND GREASE

BACKGROUND OF THE INVENTION

The invention relates in general to seals and more particularly a seal for separating grease and oil in the region of a bearing and to an assembly containing such a seal.

The drive axle of a typical large over-the-road or off-road truck has axle shafts which extend through tubular axle housings from a differential and at their ends are connected to wheel hubs which rotate about the ends of the axle housings on antifriction bearings. Usually, these bearings are tapered roller bearings which require lubrication for their successful operation. The other road wheels of such vehicles likewise usually rotate on tapered roller bearings, which are often package-sealed for life, but these bearings are simply mounted on spindles. The traditional lubrication for the spindle-mounted bearings for these other road wheels is grease. After all, grease remains along the critical surfaces where it is required, even when the bearing is at rest, and further is easily retained by seals. Moreover, the grease seals remain effective for extended periods of time, much longer than oil seals.

But many drive axles, particularly those designed for large trucks, rely on the differential lubricant, which is a gear oil, to sustain the wheel bearings. The differential housing serves as a reservoir for this oil which migrates through the tubular axle housings to the wheel bearings. This is not a totally reliable source of lubrication, and when interrupted, the results can be disruptive and costly. Apart from that, oil being harder to retain than grease, more readily passes the seals which are designed to retain it within the bearings, and oil emerging from wheel bearings often finds its way onto the brake shoes where it adversely affects the operation of the brakes.

One does not derive all of the benefits of grease lubrication simply by packing traditional oil-lubricated bearings on drive axles with grease. The oil is still present and it mixes with the grease, thereby thinning the grease and in effect returning the bearings to their former oil-lubricated condition.

The present invention resides in an assembly including a bearing that exists in the presence of oil, yet is lubricated by grease, with a seal isolating the grease from the oil. Indeed, the seal pumps one or the other of the lubricants toward its source, and preferably both toward their respective sources, that is the oil away from the interior of the bearing and the grease toward the interior of the bearing. The invention also resides in a seal having the capacity to pump in two directions.

DESCRIPTION OF THE DRAWINGS

In the accompanying drawings which form part of the specification and wherein like numerals and letters refer to like parts wherever they occur.

DETAILED DESCRIPTION

Figure 1:
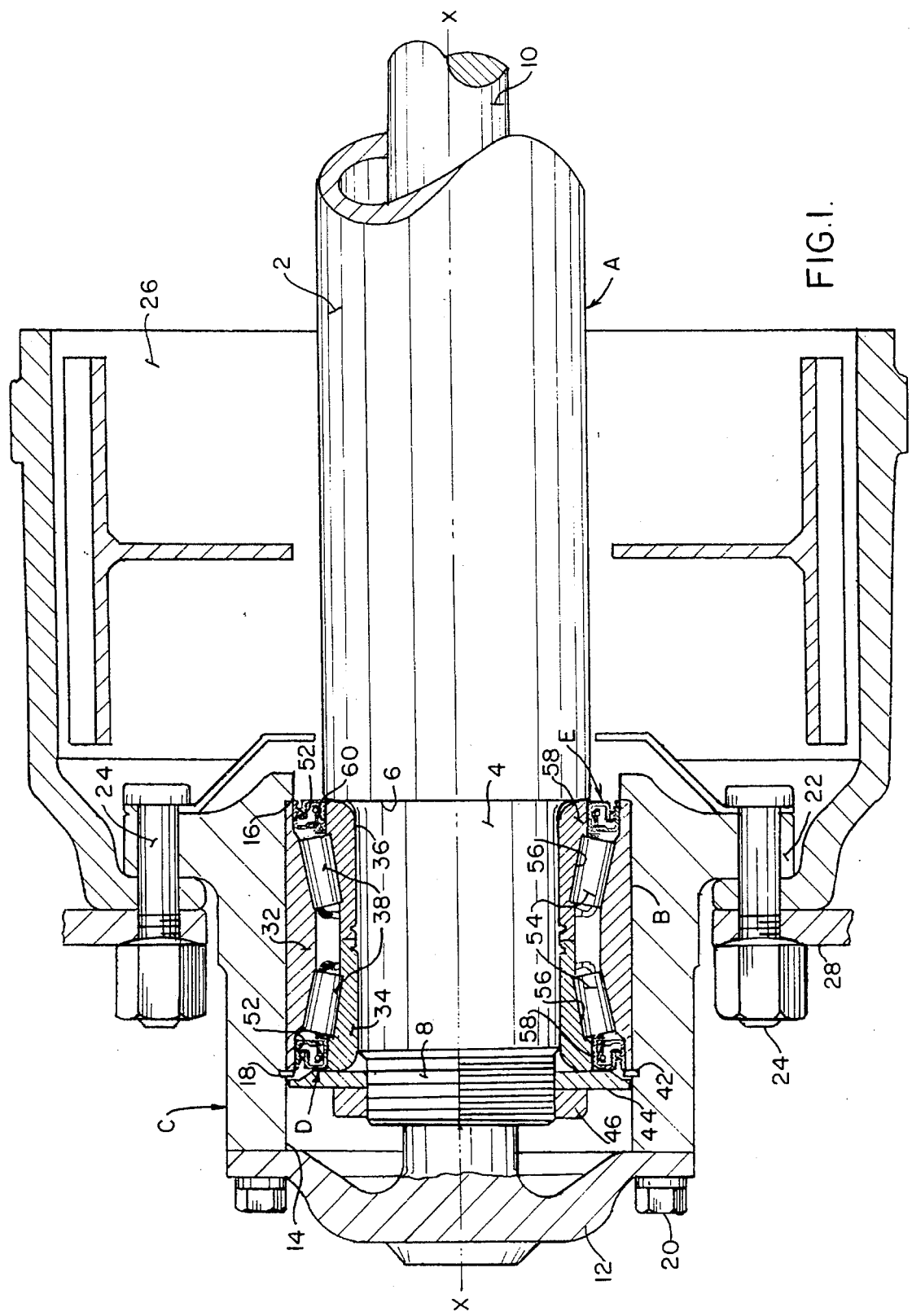
FIG. 1 is a sectional view of a drive axle and a hub mounted on the axle with a tapered roller bearing, with the bearing being fitted with a seal constructed in accordance with and embodying the present invention.

Referring now to the drawings, a drive axle A (FIG. 1) at its end carries an antifriction bearing B which in turn fits within a wheel hub C, enabling the hub C to rotate on the drive axle A with minimum friction about an axis x of rotation. The bearing B at its ends contains seals D and E which isolate the interior of the bearing B, keeping contaminants away from the critical surfaces of the bearing B. Those contaminants take the form of oil which migrates through the drive axle A and into the hub C where it encounters the outboard seal D and exterior contaminants, such as water, dust, road grit, which exist in the region of the inboard seal E.

The drive axle A includes an axle housing 2 which is reduced at its end to form a spindle 4 and shoulder 6 at the inboard end of the spindle 4. The spindle 4 in turn is reduced slightly at its outboard end where it is provided with threads 8. The bearing B fits over the spindle 4. In addition, the drive axle A has an axle shaft 10 which extends through the hollow interior of the axle housing 2 and emerges from the housing 2 at the spindle 4, beyond which it is fitted with a drive flange 12.

The wheel hub C fits around the spindle 4, it having an extended bore 14 which contains the bearing B. The bore 14 at its inboard end terminates at a shoulder 16, while near its outboard end, an annular groove 18 opens into the bore 14. The flange 12 on the axle shaft 10 overlies the outboard end of the hub C to which it is fastened with bolts 20. Thus, the axle shaft 10 and hub C are joined together and rotate in unison. The hub C in turn has a flange 22, which is located at its inboard end, and threaded studs 24 projecting from the flange 22 for securing a brake drum 26 and a road wheel 28 to the hub C.

The bearing B includes (FIG. 1) an outer race in the form of a double cup 32, an inner race in the form of two cones 34 and 36, and rolling elements in the form of tapered rollers 38 arranged in two circular rows between the cup 32 and the two cones 34 and 36. The cup 32 fits into the bore 14 of the hub C where it is captured between the shoulder 16 at the inboard end of the bore 14 and a snap ring 42 which fits into the groove 18. The two cones 14 and 16 fit over the spindle 4 and are likewise captured—indeed clamped between the shoulder 6 at the inboard end of the spindle 4 and a washer 44 held fast by a nut 46 engaged with the threads 8 at the outboard end of the spindle 4. When the axle shaft 10 rotates, the hub C, the double cup 32 revolves around the two cones 34 and 36, this establishing the axis of rotation x.

At its ends, the cup 32 has machined bores 52 (FIG. 1) which are cylindrical and actually open out of the ends of the cup 32. The bores 52 in turn lead to two raceways 54 which taper downwardly to the midportion of the cup 32. The two cones 34 and 36 lie within the cup 32, each having an outwardly presented raceway 56 that is tapered and a thrust rib 58 which projects radially outwardly beyond the large end of the raceway 56. The thrust rib 58 has a cylindrical surface 60 which runs out to the end of its cone 34 or 36, that is, to the so-called cone back face against which the clamping force of the spindle nut 46 is applied. The two cones 34 and 36 abut at their opposite ends, that is, at their front faces, and when so arranged, their raceways 56 lie within and face the raceways 54 of the cup 32, while their thrust ribs 58 lie within the end bores 52 of the cup 32. The cone raceways 56 likewise taper downwardly toward the midportion of the bearing B where the two cones 34 and 36 abut.

The rollers 38 lie in circular rows between the opposed raceways 54 and 56 of the cup 32 and the cones 34 and 36, with their tapered side faces contacting the raceways 54 and 56. The large end faces of the rollers 38 bear against the thrust ribs 58 for the cones 34 and 36, and indeed, the ribs 58 prevent the rollers 38 from being expelled from the annular space between the cup raceways 54 and the cone raceways 56, that is from the interior of the bearing A.

The outboard seal D fits into the outboard end bore 52 of the cup 32 and around the thrust rib 58 of the outboard cone 34 to close one end of the annular space between the cup and cone raceways 54 and 56 (FIG. 1). The inboard seal E fits into the inboard bore 52 of the cup 32 and around the thrust rib 58 of the inboard cone 36, closing the other end of the annular space that exists between the raceways 54 and 56. Thus, the seals D and E isolate the annular interior of the bearing B.

Figure 2:
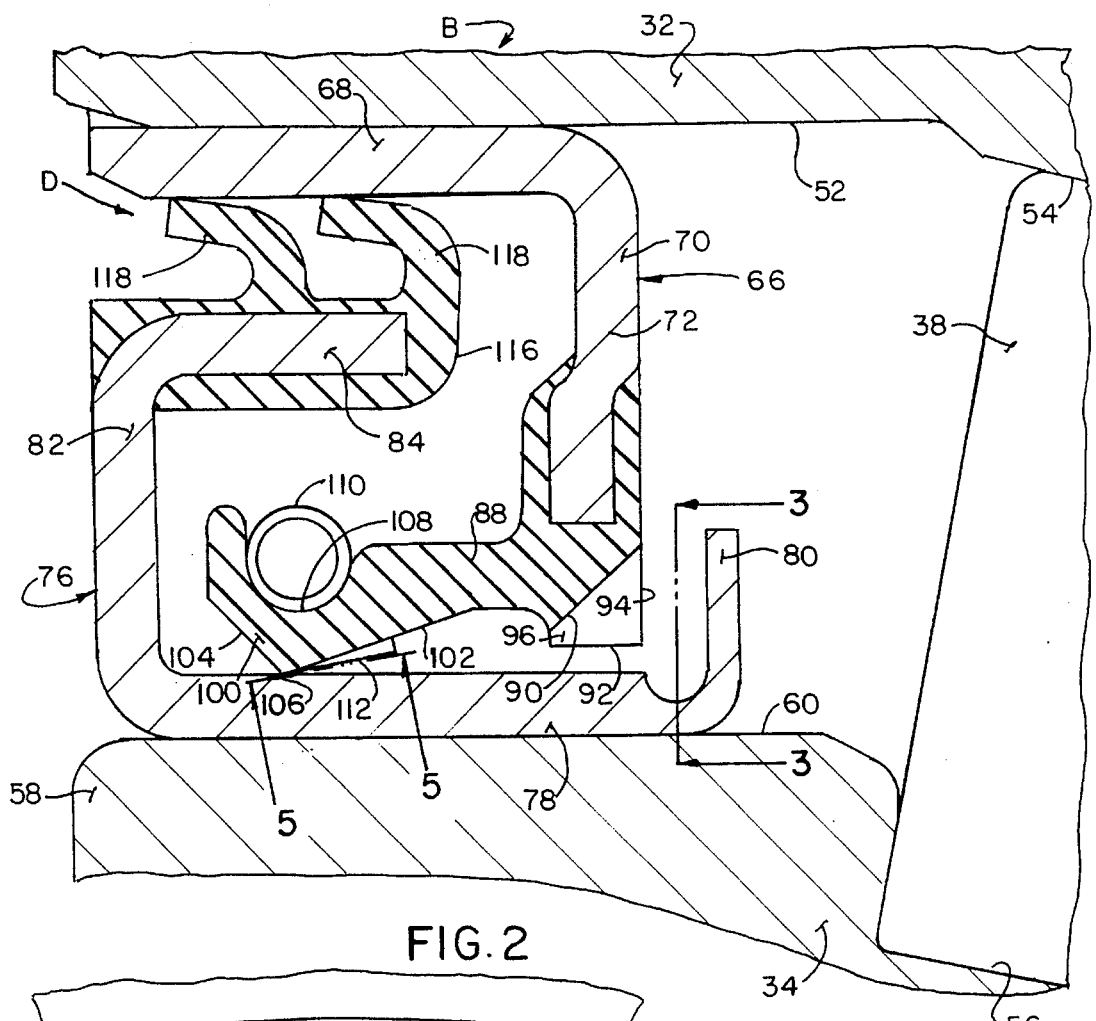
FIG. 2 is an enlarged sectional view of the seal.

The outboard seal D includes (FIG. 2) an outer seal case 66 which is formed from steel as a stamping and as such is quite rigid. It has an extended axial wall 68 which fits into the end bore 52 at the inboard end of the cup 32, there being an interference fit between the wall 68 and the cylindrical surface of the bore 52, so that the surface constitutes a mounting surface for the outer case 66. The interference fit creates a static seal between the outer case 66 and the cup 32. The axial wall 68, well within the bore 52, merges into a radial wall 70 which extends radially inwardly toward the thrust rib 58 of the inboard cone 34, terminating at a slight axial offset 72 that encircles, yet lies outwardly from, the cylindrical surface 60 on the rib 58. The radial wall 70 and its offset 72 lie immediately beyond the large ends of the tapered rollers 38.

The outboard seal D also has an inner case 76 (FIG. 2) that is quite rigid in that it too is formed as a steel stamping. It includes an extended axial wall 78 which fits over the cylindrical surface 60 on the thrust rib 58 for the outboard cone 34, and thus lies immediately inwardly from the radial wall 70 of the outer case 66. An interference fit exists between the axial wall 78 and the cylindrical surface 60 of the rib 58, so the cylindrical surface 60 provides a mounting for the inner case 76. The interference fit creates a static seal between the inner case 76 and the outboard cone 34. At its end closest to outboard row of rollers 38, the axial wall 78 turns outwardly in the form of a short radial lip 80. At its opposite end the axial wall 78 merges into a radial wall 82 which projects outwardly from the thrust rib 58 almost flush with the back face of the outboard cone 34. But the radial wall 82 terminates short of the axial wall 68 on the outer case 66, and indeed merges into a short return wall 84 which is directed generally axially toward the radial wall 70 of the outer case 66.

Figure 3:
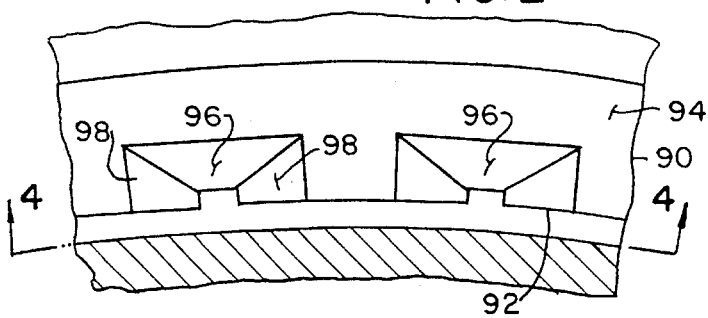
FIG. 3 is a fragmentary end view of the seal taken along line 3—3 of FIG. 2 and showing the end of the inner seal element and the pumping cavities which open out of it.
Figure 4:
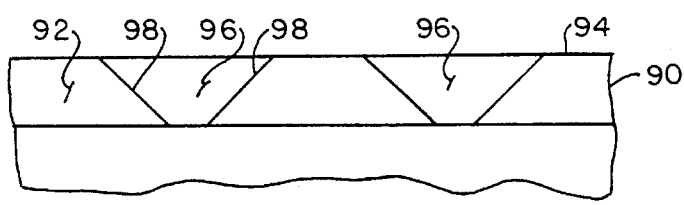
FIG. 4. is a fragmentary view of the seal taken along line 4—4 of FIG. 3 and also showing the pumping cavities.

In addition to the two cases 66 and 76, the outboard seal D has an inner seal element 88 (FIG. 2) which is formed from an elastomer and thus possesses a measure of flexibility. It is bonded to the offset 72 in the radial wall 70 of the outer case 66. At the inner margin of the radial wall 70 the inner seal element 88 takes the form of a pumping labyrinth 90 having a cylindrical surface 92 which lies around, but is spaced slightly away from, the extended axial wall 78 of the inner case 76. The labyrinth 90, which in a broad sense is a lip, also has a front face 94 which is presented toward the lip 80 on the inner case 76. The labyrinth 90 contains pumping cavities 96 which open out of the cylindrical surface 92 and the front face 94, interrupting the edge at which those faces intersect. The cavities 96 have side surfaces 98 (FIGS. 3 & 4) which lie oblique to the direction of relative movement between the pumping labyrinth 90 and the extended axial wall 78 on the inner case 76 so as to direct any grease that enters the cavities 96 back toward the lip 80 and the interior of the bearing B.

Figure 5:
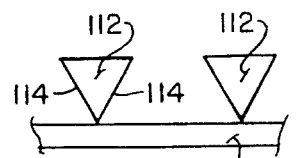
FIG. 5 is a fragmentary view of the inner seal element taken along line 5—5 of FIG. 2 and showing pumping vanes.

The seal element 88 also includes a contact lip 100 which projects generally axially away from the labyrinth 90 toward the radial wall 82 of the inner case 76. It has converging surfaces 102 and 104 which lie oblique to the axis x and meet at an edge 106 where the lip 100 actually contacts the extended axial wall 78 of the inner case 76. Indeed, immediately behind the edge 106, the lip 100 has a groove 108 which contains a garter spring 110 that urges the lip 100 radially inwardly to ensure that the edge 106 remains in contact with the axial wall 78. Along the converging surface 102 which leads away from the labyrinth 90, the contact lip 100 has vanes 112 which exist as triangular embossments formed integrally with the lip 100 (FIG. 5). The vanes 112 are arranged at equal circumferential intervals and each has an apex at the contact edge 106 with both of the side edges 114 that lead away from that apex being oblique to the direction of relative movement between the contact lip 100 and the axial wall 78 of the inner case 76. The vanes 112 direct oil which seeps under the contact edge 106 back to the contact edge 106 to maintain an oil film between the edge 106 and the axial wall 78 of the inner case 76. Thus, the pumping labyrinth 90 and contact lip 100 establish fluid barriers along the seal surface formed by the extended axial wall 68 of the inner case 56. Moreover, the labyrinth 90 pumps grease toward the rollers 38 that roll within the interior of the bearing B, while the lip 100 pumps oil away from the interior of the bearing B.

Another fluid barrier exists between the return wall 84 of the inner case 76 and the axial wall 68 of the outer case 66, that barrier being established by an elastomeric outer seal element 116 (FIG. 2) which is bonded to and totally encapsulates the axial return wall 84. The seal element 116 has two lips 118 which project radially outwardly and then turn obliquely away from the radial wall 70 of the outer case 66. The obliquely directed portions of the lips 118 contact the axial wall 68 of the outer case 66, so the wall 68 likewise serves as a sealing surface. Being formed from an elastomer, the lips 118 possess a measure of flexibility.

The seal D is furnished fully assembled, and as such its two cases 66 and 76 cannot be separated. To install the seal D in the bearing A, one simply aligns the axial wall 68 of the outer case 66 with the end bore 52 at the outboard end of the cup 32 and concurrently aligns the extended axial wall 78 of the inner case 76 with the cylindrical surface 60 on the thrust rib 58 of the outboard cone 34. Thereupon, axially directed forces are applied to both the outer and inner cases 66 and 76 with sufficient magnitude to drive the axial wall 68 of the outer case 66 along the cylindrical surface of the end bore 52 and the extended axial wall 78 of the inner case 76 over the cylindrical surface 60 of the thrust rib 58. The axial force on the outer case 66 continues until the end of extended axial wall 68 lies fully within the bore 52, but nevertheless close to the end face of the cup 32. The axial force on the inner case 76 continues until the case 76 in its entirety is over the thrust rib 58 at the outboard cone 34—indeed, with the radial wall 82 of that case slightly offset from the back face of the cone 34.

The inboard seal E fits into the inboard end bore 52 of the cup 32 and around the thrust rib 58 of the inboard cone 36. Preferably it takes the form of the outboard seal D, although seals of other configurations are acceptable as well. It is installed in a like manner.

Being secured in the end bores 52 of the unitary or double cup 32, the seals D and E prevent the cones 34 and 36 from being withdrawn from the cup 32. The seals D and E thus serve to unitize the bearing B, enabling the bearing B, to be furnished as a prelubricated unitary package.

In operation, the hub C rotates about the spindle 4 of the drive axle A with relatively little frictional resistance, this owing to the presence of the bearing B between the two. Where torque is required to sustain the rotation, it is transferred through the axle shaft 10 and drive flange 12 to the hub C. The double cup 32 of the bearing B of course rotates with the hub C, whereas the two cones 34 and 36 remain fixed in position on the spindle 4 of the axle housing 2. The tapered rollers 38 roll along the raceways 54 of the cup 32 and the raceways 56 of the two cones 34 and 36 with their large end faces against the thrust ribs 58 for the cones 34 and 36. Of all the surfaces within the bearing B, the large end faces of the rollers 38 and the faces of the ribs 58 against which those roller end faces bear are the most critical, and the absence of adequate lubrication along these surfaces could very well damage the bearing B. Hence, the presence of grease within the interior of the bearing B, that is within the annular spaced closed at its ends by the two seals D and E. The rollers 38 pump the grease up the raceways 54 and 56 and thereby distribute it along the raceways 54 and 56 and more importantly distribute it along the surfaces of the thrust rib 58 against which the large ends of the rollers 38 bear.

The seals D and E confine the grease to the annular space between the cup 32 and the two cones 34 and 36. With regard to the seal D, the labrinth 90, which is carried by the outer seal case 66, serves as a grease barrier along the sealing surface formed by the extended axial wall 78 of the inner case 76. As the labyrinth 90 revolves about the axial wall 78, grease which migrates over the axial wall 78 enters in the pumping cavities 96 of the labyrinth 90 and is deflected back toward the rollers 38 by the side surfaces 98 of the cavities 96, for the side surfaces 98 are oriented oblique to the circumferential direction of movement which the labyrinth 90 undergoes. Actually, the side surfaces 98 for each cavity 96 impart wedge-shaped confiruations to the cavity 96, and this enables the cavity 96 to pump irrespective of the direction of rotation. When the labyrinth 90 rotates in one direction, the angulated side surface 98 on one side of the cavity 96 deflects the grease, whereas during rotation in the opposite direction the angulate side surface 98 on the other side of the cavity 96 deflects the grease. The labyrinth 90 provides a highly effective barrier to the escape of grease, even though it does not actually contact the axial wall 78 which it encircles. When the bearing B is at rest, a minimal amount of grease may seep past the labyrinth 90 and under the contact lip 100 to the edge 106 along which the lip 100 bears against the axial wall 78 of the inner case 76, but this is desirable in that it reduces the friction between the edge 106 and the wall 78 and thereby prevents the inner seal element 88 from overheating.

Apart from keeping the grease within the interior of the bearing B, the seal D also excludes oil from the interior of the bearing B, which is important, since oil will dilute the grease and render it less effective and more difficult to retain. And oil is ever-present. In this regard, the interior of the axle housing 2 opens into the interior of a differential housing from which the axle housing 2 extends, and the differential housing serves as a reservoir for a gear oil. As the axle shaft 10 rotates within the axle housing 2, oil from the differential housing moves through the axle housing 2 into the extended bore 14 of the hub C. But the seal D prevents the oil from entering the annular space between the cup 32 and the two cones 34 and 36, that is the annular space which represents the interior of the bearing B. First the oil encounters the outer seal element 116 which is bonded to the return wall 84 of the inner seal case 76. Its two lips 118 bear against the axial wall 68 of the outer case 66 and establish a very effective fluid barrier between the outer and inner cases 66 and 76. But if the oil does penetrate the barrier formed by the two lips 118, it still does not reach the annular space between the cup 32 and the two cones 34 and 36, for the contact lip 100, which bears against the extended axial wall 78 of the inner seal case 76 creates another barrier. Moreover, the lip 100, by reason of the vanes 112 on its beveled surface 102, pump any oil Which works its way under the edge 106 where the lip 100 contacts the axial wall 78, back under that edge. In other words, oil which passes beneath the contact lip 100 at the edge 106 where that lip bears against the axial wall 78 encounters the side edges 114 of the vanes 112, and those edges, being oblique to the direction of relative movement between the lip 100 and axial wall 78, deflect the oil and indeed drive the oil back to the edge 106 where it serves to maintain an elastohydrodynamic oil film between the lip 100 and the axial wall 78. Actually only the leading side edges 114, that is those which lead as the inner seal element 88 rotates about the axial wall 78 of the inner case 76, serve to deflect and hence pump the oil, but the triangular configuration of the vanes 112 enables the lips 100 to effect the same pumping in the opposite direction of rotation and hence gives the lips 100 unidirectional pumping characteristics. Thus, the oil, even if it does migrate as far as the lip 100, still does not mix the grease and the grease remains at its original consistency.

The other seal E, which is at the inboard end of the bearings B, likewise serves to retain the grease within the annular space between the cup 32 and the cones 34 and 36 and further excludes contaminants from that space. Those contaminants take the form of water, road grit, and dust from the linings on the brake shoes that expand against the brake drum 26.

While the primary grease lip of the seal D is depicted and described as the labyrinth 90, it may take other forms. For example it may be a contact lip. Moreover it may rely on vanes to pump the grease back toward the rollers 38, and those vanes need not necessarily be triangular. By the same token, the mechanism on the contact lip 100 for pumping the oil need not be triangular vanes 112 or even located on the beveled surface 102. Also, one or both of the lips 118 on the outer seal element 116 may have vanes to pump oil back into the bore 14 of the hub C.

Apart from variations in the pumping mechanism of the seal D, the seal D may be fitted to the extended bore 14 of the hub C instead of into the cup 32 of the bearing B and indeed, that would be the preferred form of mounting if the cup 32 of the bearing B ended at the large ends of its raceways 54 and did not have the axial extensions which contain the end bores 52.

This invention is intended to cover all changes and modifications of the example of the invention herein chosen for purposes of the disclosure which do not constitute departures from the spirit and scope of the invention.

What is claimed is:

1. In combination with a first machine component and a second machine component that has a hollow interior which receives the first machine component and further contains a lubricant in the form of oil, and with an antifriction bearing for enabling one of the machine components to rotate relative to the other machine component, the bearing having an inner race located around the first machine component, an outer race within the second machine component and encircling the inner race such that an annular space exists between the races to form the interior of the bearing, and rolling elements arranged in a circular row between the races, the annular space of the bearing containing a lubricant in the form of grease, sealing surfaces carried by at least one of the components and located within the hollow interior of the second component, a seal for isolating the grease within the annular space of the bearing from the oil in the hollow interior of the second component, said seal comprising: a first seal lip in the form of a labyrinth carried by one of the components and establishing a dynamic fluid barrier along one of the sealing surfaces that is carried by the other component, the first seal lip being spaced slightly from the one sealing surface and being exposed to the annular space between the races and to the grease in that annular space, the first lip being configured to pump grease which encounters it back toward the annular space; a second lip carried by one of the components and contacting a sealing surface carried by the other component to form another dynamic fluid barrier beyond the first lip, so that the first lip is located between the annular space between the races and the second lip, the second lip being exposed through the space between the first lip and its sealing surface to the annular space between the races, so that a small amount of grease will migrate to the second lip on occasion; and a third lip carried by one of the components and contacting a sealing surface to form still another dynamic fluid barrier beyond the second lip, so that the second lip is interposed between the first and third lips, the third lip being exposed to the oil in the interior of the second machine component, at least the second and third lips being formed from an elastomeric material.

2. The combination according to claim 1 wherein the first seal lip is configured to pump grease which encounters it along the sealing surface back toward the interior of the bearing, and wherein the seal further comprises means for supporting each seal lip on the component opposite the component which carries the sealing surface along which it establishes a barrier.

3. The combination according to claim 2 wherein the second lip is configured to pump oil away from the interior of the bearing.

4. The combination according to claim 3 wherein the means for supporting each lip is a rigid seal case.

5. The combination according to claim 4 wherein first and second lips are attached to and supported on the same seal case and establish their barriers along the same sealing surface.

6. The combination according to claim 5 wherein the second lip contacts the sealing surface along a circular edge and the second lip has pumping elements which lie between its edge and the first lip and pump oil toward the edge.

7. The combination according to claim 6 wherein the sealing surfaces are directed axially with respect to the axis of rotation for the bearing.

8. The combination according to claim 7 wherein the case that supports the first and second lips rotates and the sealing surface for those lips does not rotate.

9. The combination according to claim 8 wherein the case that supports the first and second lips is in the outer race of the bearing and the sealing surface for those lips extends around the inner race of the bearing.

10. The combination according to claim 9 wherein the sealing surface for the first and second lips is on another case, and the case which carries the first and second lips also has a sealing surface, and the third lip is on the other case.

11. The combination according to claim 10 wherein the first and second lips are formed integrally from an elastomer.

12. In combination with outer and inner machine components, one of which rotates relative to the other, the machine components defining an enclosed annular space which contains oil and grease, a seal located in the annular space for separating the oil and the grease, said seal comprising: an outer case of annular configuration fitted to the outer machine component, an inner case of annular configuration fitted to the inner machine component and located generally within the outer case, at least one case having a sealing surface presented toward the other case; a first seal lip on one of the cases and extended along the sealing surface of the other case, the first lip being exposed to the grease at one end of the seal and being configured to pump the grease that encounters it at the sealing surface away from that end of the seal when relative rotation occurs between the cases; and a second lip located on one of the cases and extending along and contacting the sealing surface of the other case, the second lip being configured to pump oil in the direction opposite to that in which the grease is pumped when relative rotation occurs between the cases.

13. A seal according to claim 12 wherein the second lip contacts the sealing surface along which it extends at a circular edge and carries vanes which pump oil toward the circular edge.

14. A seal according to claim 13 wherein the first and second lips are on the outer case, and further comprising at least one third lip on the inner case and contacting the sealing surface on the outer case.

15. A seal according to claim 14 wherein the sealing surface extends axially.

16. A seal according to claim 15 wherein the first lip is spaced from the sealing surface of the inner case to establish a labyrinth along that sealing surface.

17. In combination with an axle housing having a hollow interior that is in communication with a source of lubricating oil, and with a hub that has a hollow interior which receives the axle housing and is in communication with the hollow interior of the axle housing so that oil flows from the interior of the axle housing into the interior of the hub, and with a bearing that enables the hub to rotate on the axle housing about an axis of rotation, the bearing including an outer race located in the hollow interior of the hub, an inner race located on the axle housing, and rolling elements located in a circular row between the races and rolling along the races when the hub revolves about the axle housing, the rolling elements separating the races so that the bearing has an annular interior, the annular interior containing grease, the hub and the axle housing each carrying a mounting surface; a seal for isolating the grease within the interior of the bearing from the oil within the interior of the hub, said seal comprising: a first case fitted to one of the mounting surfaces such that a static seal exists between the case and mounting surface, the first case providing an axially directed sealing surface; a second case fitted to the other mounting surface such that a static seal exists between the second case and other mounting surface; a first seal lip in the form of a labyrinth attached to the first case and located along the sealing surface of the second case where it establishes a dynamic fluid barrier, yet is spaced slightly from that sealing surface, the first lip confronting the interior of the bearing such that it is exposed to the grease; an elastomeric second lip attached to the first case and having an edge along which it contacts the sealing surface of the second case to establish a dynamic fluid barrier beyond the first lip, so that the first lip is interposed between the second lip and the interior of the bearing, the second lip being exposed to the interior of the bearing through the space between the first lip and the sealing surface, so that a small amount of grease will migrate to the second lip on occasion and lubricate the edge where the second lip contacts the sealing surface; and an elastomeric third lip on one of the cases and contacting the other case, the third lip being located beyond the second lip and confronting the interior of the hub where it is exposed to the oil, the third lip establishing a dynamic fluid barrier which retards the advancement of oil toward the second lip.

18. The combination according to claim 17 wherein the second lip has vanes located between the edge and the first lip, and the vanes pump oil that migrates along the sealing surface toward the edge.

19. The combination according to claim 17 wherein the first case to which the first and second lips are attached is in the outer race of the bearing and the case which has the sealing surface and to which the third lip is attached is on the inner race of the bearing.

20. The combination according to claim 17 wherein the mounting surfaces are on the races of the bearing.

21. The combination according to claim 20 wherein the first case is fitted to the mounting surface of the outer race, and the second case is fitted to the mounting surface of the inner race.

22. The combination according to claim 17 wherein the first case has an axially directed sealing surface and the third lip is on the second case and contacts the sealing surface of the first case.

23. The combination according to claim 17 wherein the first lip is configured to pump grease which encounters it toward the interior of the bearing.

24. The combination according to claim 23 wherein the second lip is configured to pump lubrication that encounters it on the side of the edge that is toward the first lip underneath the edge to maintain a film of lubrication between the edge and the sealing surface.

* * * * *